United States Patent [19]

Kerney

[11] Patent Number: 4,669,563

[45] Date of Patent: Jun. 2, 1987

[54] QUICK-RELEASE ARRANGEMENT FOR RELEASABLY-PIVOTALLY SUPPORTING TWO MEMBERS TOGETHER

[75] Inventor: Jeffery E. Kerney, Hayward, Calif.

[73] Assignee: Paccar, Inc., Bellevue, Wash.

[21] Appl. No.: 853,148

[22] Filed: Apr. 17, 1986

[51] Int. Cl.[4] .......... B62D 25/12

[52] U.S. Cl. .......... 180/69.24; 16/262

[58] Field of Search .......... 16/260, 262; 180/69.2, 180/69.24

[56] References Cited

U.S. PATENT DOCUMENTS

| | | | |
|---|---|---|---|
| 1,054,907 | 3/1913 | Cowan | 16/262 |
| 1,079,536 | 11/1913 | Baum | 16/356 |
| 1,166,926 | 1/1916 | O'Neill | 180/69.2 |
| 1,180,254 | 4/1916 | Carver | 180/69.2 |
| 1,263,514 | 4/1918 | Bernard | 16/265 |
| 1,299,944 | 4/1919 | Houston et al. | 180/69.2 |
| 1,316,579 | 9/1919 | Kehoe | 180/69.2 |
| 3,195,920 | 7/1965 | Knisely et al. | 280/154.5 R |
| 3,270,462 | 9/1966 | Obadal et al. | 180/69.2 X |
| 4,358,871 | 11/1982 | Takai | 16/262 |
| 4,603,452 | 8/1986 | Paciorek | 16/262 |

*Primary Examiner*—John J. Love
*Assistant Examiner*—Michael Mar
*Attorney, Agent, or Firm*—Flehr, Hohbach, Test, Albritton & Herbert

[57] ABSTRACT

A quick-release hinge arrangement is provided for releasably-pivotally supporting two members and more particularly a section of a truck hood and its adjacent side panel. This arrangement includes a first hinge leaf connected with a first one of the members, for example the section of the truck hood just mentioned, and a second hinge leaf connected with a second one of the members, for example the adjacent side panel. An arrangement is provided for releasably-pivotally connecting the hinge leafs together and includes a set of first and second cooperating closed knuckles forming part of the first and second leafs, respectively, a quick-release pin removably inserted through cooperating knuckles for pivotally connecting the leafs together, a fixed pin carried by one of the leafs, and an open knuckle which is formed as part of the other leaf and which releasably-pivotally receives the fixed pin. In that way, with the quick-release pin in place within its closed knuckles, two members are pivotally supported to one another. When the release pin is removed, two members may be separated from one another but, upon initial release of the pin, remain supported to one another.

7 Claims, 7 Drawing Figures

QUICK-RELEASE ARRANGEMENT FOR RELEASABLY-PIVOTALLY SUPPORTING TWO MEMBERS TOGETHER

The present invention relates generally to support arrangements and more particularly to a quick-release arrangement for releasably-pivotally supporting two members together, especially a section of a truck hood with an adjacent side panel.

Currently there are two off-highway truck hood variations in commercial use; a "butterfly" hood, in which the hood top and hood side are hinged together and open as a unit, and a "slide-in" hood, in which the hood top hinges open and a separate hood side slides vertically out of cooperating channels. The first of these two commercially available embodiments is shown in FIG. 1 which illustrates a truck 10 including a hood assembly 12 comprised of opposing top hood sections 14 pivotally connected together by means of a hinge mechanism 16 and opposite side panels 18 (only one of which is shown). The side panels are pivotally connected to opposing edges of hood sections 14 by means of hinge mechanisms 20. Note that each side panel 18 is fixedly-pivotally conneted with its adjacent hood section 14. The second mentioned commercially available embodiment is illustrated in FIG. 2 which shows a similar truck 10' including hood sections 14 pivotally connected together by means of a hinge mechanism 16. However, each of the side panels 18' of truck 10' at all times remains unconnected with its adjacent hood section. Rather, it is supported within opposing tracks or channels 22 which allow the side panel to be readily removed from the rest of the vehicle.

Applicant has found it to be desirable to be able to combine the two embodiments described in FIGS. 1 and 2 that is, to be able to pivotally connect each of the side panels of truck 10 or 10' with its adjacent hood section, while at the same time, being able to readily separate the side panels in the vehicle. One way this could be done is to design the hinge 20 illustrated in FIG. 1 as a loose pin hinge. In that way, the pin could be removed from its cooperating leaf, thereby separting the side panel 18 from its adjacent hood section 14. However, actual practice, it is difficult to remove the pin and, once the pin is removed, the side panel is no longer supported and could fall to the ground, quite possibly injuring the operator.

In view of the foregoing, it is an object of the present invention to provide a means of combining the embodiments illustrated in FIGS. 1 and 2 without the disadvantages just recited.

It is a more particular object of the present invention to provide a quick-release arrangement for releasably-pivotally supporting a side panel of the general type illustrated in FIGS. 1 and 2 with an adjacent hood section such that the side panel can be separated from the hood section without the disadvantages recited above, that is, with relative ease and without the side panel dropping to the ground.

A further object of the present invention is to provide a quick-release arrangement for releasably-pivotally supporting two members generally, not necessarily the side panel and hood section just mentioned, in a way which eliminates the disadvantages recited above.

As will be seen in more detail hereinafter, the quick-release arrangement disclosed herein includes a first hinge leaf connected with a first member, for example hood section 14 illustrated in FIG. 1, and a second hinge leaf connected to a second member, for example adjacent side panel 18. Means are provided for releasably-pivotally connecting the two hinge leafs together and include at least one set of first and second cooperating closed knuckles forming part of the two leafs, respectively, a quick-release pin removably insertable through the set of cooperating knuckles for pivotally connecting the leafs together, a fixed pin carried by one of the leafs, and an open knuckle formed as part of the other leaf for and releasably-pivotally receiving the fixed pin.

With the overall arrangement designed in this way, panel 18 is pivotally connected and supported by adjacent hood section 14 in the manner illustrated in FIG. 1. However, the side panel can be readily separated from its adjacent hood section by carrying out two steps. First, each quick-release pin (typically two are used) is removed from its cooperating set of closed knuckles. However, note that the side panel remains supported to its side section by means of the fixed pin and open knuckle. As the second step in the process, the side panel is entirely removed from the hood section by lifting the fixed pin off of its associated knuckle. In this procedure, when the release pins are first removed from their cooperating leafs, the side panel does not automatically become unsupported from the hood section as would be the case with standard loose pin hinges, as described above. Otherwise, the arrangement disclosed herein functions in the same manner as a standard loose pin hinge to pivotally support a side panel to the hood section while making it possible to separate the two from one another.

The invention will be described in more detail hereinafter in conjunction with the drawings wherein.

Figure 4:
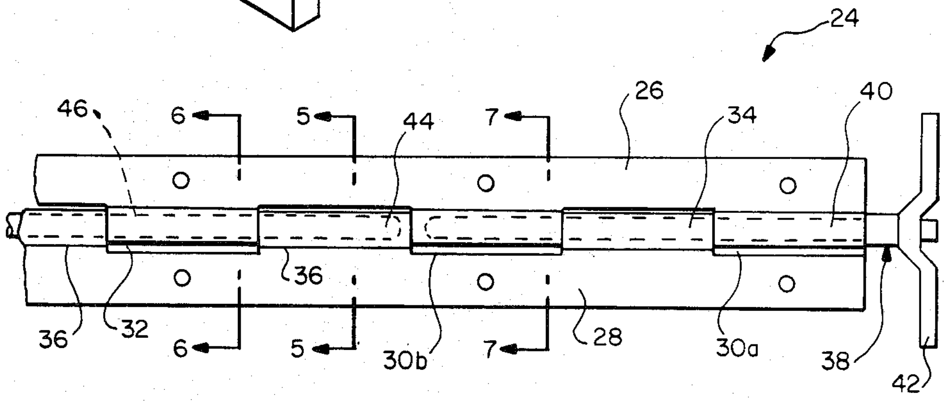
Figures 5, 6, 7:
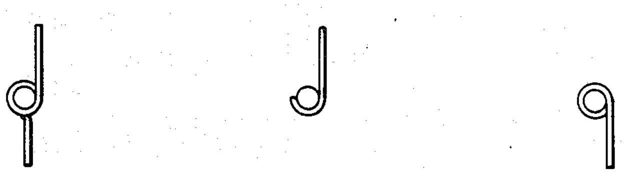

FIG. 4 is an enlarged plan view of a quick-release hinge arrangement which is designed in accordance with the present invention for releasably-pivotally supporting two members together; and FIG. 5, 6 and 7 are sectional views of the arrangement illustrated in FIG. 4, taken generally along lines 5—5, 6—6 and 7—7, respectively, in FIG. 4.

Figure 3:
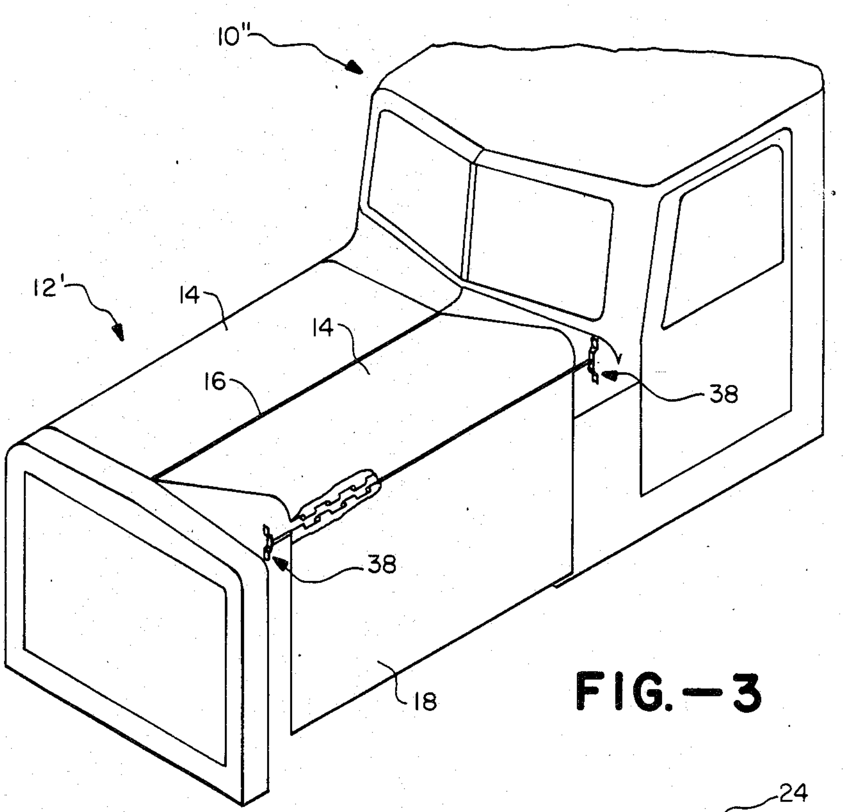
FIG. 3 is a perspective view of a front section of a truck including a hood/side panel assembly designed in accordance with the present invention.

Turning now to the drawings wherein like components are designated by like reference numerals throughout the various figures, attention is immediately directed to FIG. 3 which illustrates a section of a truck 10'' including a hood assembly 12' comprised of top hood sections 14 pivotally connected together by means of hinge mechanism 16 and side panels 18, each of which is pivotally connected to an adjacent hood section by means of a quick-release hinge arrangement 24 designed in accordance with the present invention. In a preferred embodiment of the present invention, arrangement 24 extends the entire length of its associated hood section 14 and side panel 18.

Turning to FIGS. 4–7, attention is now directed to the structural details of arrangement 24 and the way in which it functions to releasably-pivotally support side panel 18 to adjacent hood section 14 in accordance with the present invention. As illustrated best in FIG. 4, arrangement 24 includes a first elongated, rigid hinge leaf 26 which is welded, bolted or otherwise suitably fixedly connected to hood section 14 and a second elongated, rigid hinge leaf 28 fastened in a similar manner to side panel 18 in the positions illustrated in FIG. 3, that is, along joining edges of the hood section and side panel. The leaf 26 includes downwardly depending and longitudinally spaced end knuckles 30*a* and 30*b* at each of its ends (only one end is shown in FIG. 4) and a pair of longitudinally spaced intermediate, downwardly depending knuckles 32, only one of which is illustrated in FIG. 3. Leaf 28 includes an upwardly projecting knuckle 34 at each end thereof and a pair of longitudinally spaced apart intermediate, upwardly projecting knuckles 36. The knuckles are preferably integrally formed with their respective leafs and interlace between one another in the manner shown in FIG. 4.

Still referring to FIG. 4 in conjunction with FIGS. 5, 6 and 7, it is important to note that all of the knuckles, with the exception of knuckles 32 include entirely annular end sections, at best illustrated in FIGS. 5 and 7. At the same time, the knuckles 32 turn up at their ends only approximately 180° (like a reversed J as illustrated specifically in FIG. 6). As seen in FIG. 4, arrangement 24 also includes a quick-release pin 38 comprised of an elongated shaft 40 and end handle 42. The shaft 40 is inserted within the three knuckles 30*a*, 30*b* and 34 for pivotally connecting these knuckles about the axis of shaft. Arrangement 24 further includes a fixed pin 44 held in place within the knuckles 36 of leaf 28 and, as seen in FIG. 4, these latter knuckles are longitudinally spaced from one another so that a mid-section 46 of the fixed pin extends between these latter two knuckles. At the same time, the opened knuckle 32 is positioned between the knuckles 36 and extends partially around the exposed section 46 of fixed pin 44 so as to releasably-pivotally receive that section of the fixed pin.

FIG. 4 illustrates only one end section of overall arrangement 24. The opposite end includes interlaced knuckles corresponding to knuckles 30*a*, 30*b*, and 34 and a cooperating quick-release pin corresponding to quick-release pin 38. This latter end section is shown in FIG. 3 along with the second quick-release pin. In addition, depending upon the length of the overall arrangement, it may include one or more fixed pins 44 and cooperating closed and opened knuckles corresponding to knuckles 32 and 36.

Figure 1:
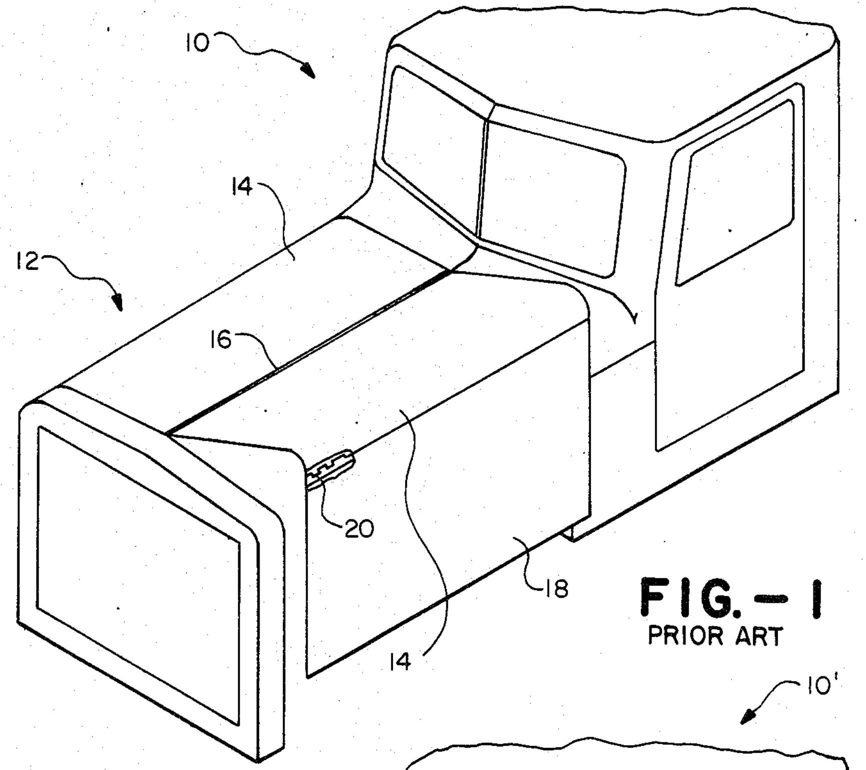
FIG.-1 PRIOR ART
FIGS. 1 and 2 are perspective views of the front sections of two trucks, each of which incorporates hood/side panel assemblies designed in accordance with the prior art.
Figure 2:
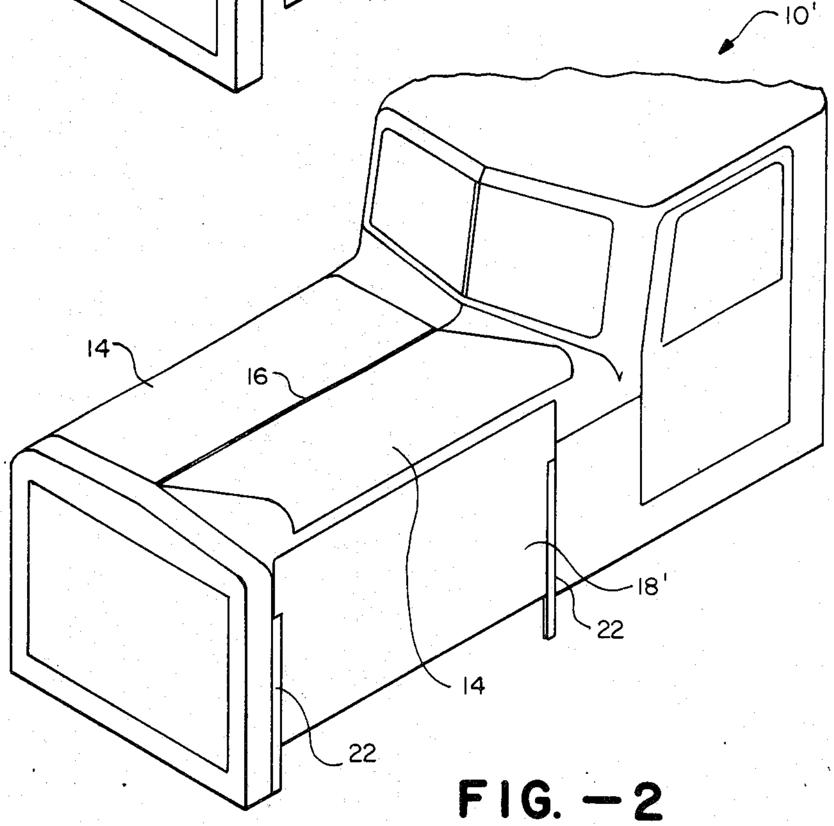
FIG.-2 PRIOR ART

From the forgoing description of arrangement 24, it should be apparent that, so long as the two leafs 26 and 28 are held together by means of the quick-release pins 38 and fixed pin or pins 44, the arrangement functions as a hinge mechanism in the same manner as hinge mechanism 20 illustrated in FIG. 1. However, in accordance with the present invention, in order to separate side panel 18 from hood section 14, it is necessary to carry out two simple steps. First, the quick-release pins 38 are removed from opposite ends of the arrangement thereby disconnecting knuckles 30*a*, 30*b* from knuckle 34 at each end of the arrangement. It should be noted that at this point the side panel remains supported to the section by means of the fixed pin or pins 44 which remain held by a knuckle or knuckles 32. As a result, the hood panel does not fall to the ground nor does it automatically misalign with the hood section when one pin is pulled, making it difficult to pull the other pin, as is the case when loose pin hinges are used.

Once the quick-release pins 38 are removed from the rest of arrangement 24, the side panel 18 is held in position by the fixed pin or pins 44 extending across the opened knuckle or knuckles 32, as indicated above. The next step in the procedure to remove the side panel is to lift up slightly on the panel and outwardly away from the hood section so that the fixed pin or pins will free themselves from their respective open knuckles. In otherwords, if takes a positive step of lifting the side panel up and away from the hood section in order to remove it. This insures that the side panel does not inadvertently break loose from its hood section, thereby falling to the ground and possibly causing injury to the operator.

The foregoing has been a description of a preferred embodiment. It is to be understood that the exact configuration of opened and closed knuckles may vary in accordance with the present invention so long as the two steps just described are necessary in order to separate the side panel from its hood section. Also, it should be apparent that the present invention is useful in connecting other types of components, for example cabinets, awnings, doors, access panels and the like in both the automotive and non-automotive fields.

What is claimed is:

1. A quick release hinge arrangement for releasably pivotally supporting two members together, comprising:

(a) a first hinge leaf adapted for connection with a first one of said members and a second hinge leaf adapted for connection with a second one of said members; and (b) means for releasably-pivotally connecting said hinge leafs together when the latter are connected to said first and second members whereby to releasably-pivotally connect said members together, said connecting means including (i) a set of first and second cooperating closed knuckles forming part of said first and second leafs, respectively, (ii) a quick-release pin removably insertable through said cooperating knuckles for pivotally connecting said leafs together, and (iii) a fixed pin carried by one of said leafs and an open knuckle which is formed as part of the other of said leafs and which is configured to releasably-pivotally receive said fixed pin, said one leaf including spaced-apart means for supporting said fixed pin therbetween.

2. An arrangement according to claim 1 wherein said set of closed knuckles includes two such knuckles spaced apart from one another on its associated leaf and one such closed knuckle on the other leaf with the knuckles of the set interlaced between one another and wherein said quick-release pin extends through the interlaced knuckles.

3. An arrangement according to claim 2 wherein said connecting means includes said first mentioned set and a second set of interlaced closed knuckles on each end of said leafs, each including its own quick-release pin, and wherein said fixed pin and open knuckle are located therebetween.

4. An arrangement according to claim 3 wherein said open knuckle is formed as part of said first leaf and wherein said second leaf includes two spaced-apart closed knuckles serving as said spaced-apart means for supporting said fixed pin therebetween.

5. An arrangement according to claim 4 wherein said first member is a top section of a hood of a truck and said second member is an adjacent side panel of said truck.

6. In an assembly including adjacent first and second members which during normal operation are pivotally connected together along adjacent, parallel edges but which, on occasion, could be separated from one another, a quick-release hinge arrangement for releasably-pivotally supporting the two members together, comprising:

(a) a first hinge leaf fixedly connected with a first one of said members and a second hinge leaf fixedly connected with a second one of said members; and (b) means for releasably-pivotally connecting said hinge leafs together whereby to releasably-pivotally connect said members together, said connecting means including (i) a first set of first and second cooperating closed knuckles respectively forming part of said first and second leafs at one end of the latter and a second set of first and second cooperating closed knuckles respectively forming part of said first and second leafs at the opposite end of the latter, (ii) a quick-release pin removably inserted through each set of cooperating knuckles for pivotally connecting said leafs together and (iii) spaced-apart means forming part of said first leaf and supporting a fixed pin therebetween, and (iv) an open knuckle which is formed as part of said second leaf for releasably-pivotally receiving said fixed pin.

7. An arrangement according to claim 6 wherein said first member is a top section of a hood of a truck and said second member is an adjacent side panel of said truck.

* * * * *